(No Model.)

W. S. HUNTER.
STOCK CAR.

No. 250,251. Patented Nov. 29, 1881.

WITNESSES

H. A. Prince
L. Curtis

INVENTOR

William Stuart Hunter
By his Attorney
John D. Evans

UNITED STATES PATENT OFFICE.

WILLIAM STUART HUNTER, OF BELLEVILLE, ONTARIO, CANADA, ASSIGNOR OF ONE-HALF TO THOMAS FULLER, OF SAME PLACE.

STOCK-CAR.

SPECIFICATION forming part of Letters Patent No. 250,251, dated November 29, 1881.

Application filed August 20, 1881. (No model.) Patented in England June 24, 1881.

*To all whom it may concern:*

Be it known that I, WILLIAM STUART HUNTER, of Belleville, in the county of Hastings and Province of Ontario, Canada, have invented certain Improvements in Stock-Cars, of which the following is a specification.

This invention is an improvement upon the mode of suspending and operating the partition of a former one, for which Letters Patent have been granted to me by the Patent Office of the United States of America, bearing date May 17, 1881; and it consists in the combination of bars and folding partitions in such a manner that ships, railway-cars, or stables may be divided off into any number of stalls or compartments transversely, one or more animals being allotted to each stall, the object being to provide a yielding partition, affording the animal more room when lying down than actually required when standing. When the animal rises to its feet again it must confine itself to the space allotted to it, at the same time providing a partition which will secure the greatest facilities for loading and unloading; also, its ready means of folding up into a small compass when the car should be required for other description of freight, as well as when it is necessary for the purposes of loading and unloading the cattle, and also its simplicity and adaptability, at a comparatively trifling cost, to be furnished to any description of stock-car now in general use.

Figure 1:
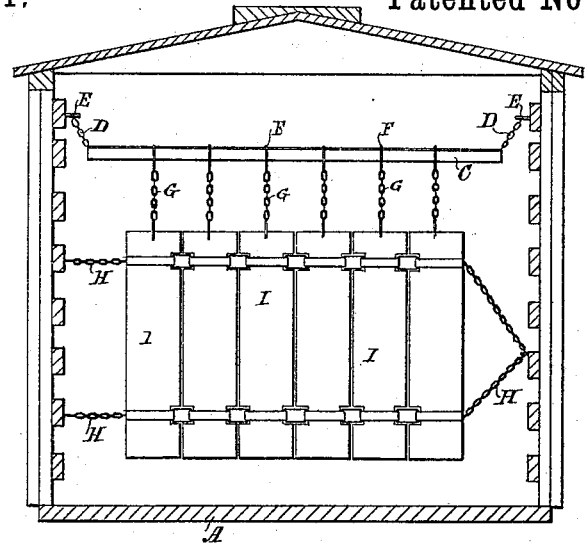
Figure 2:
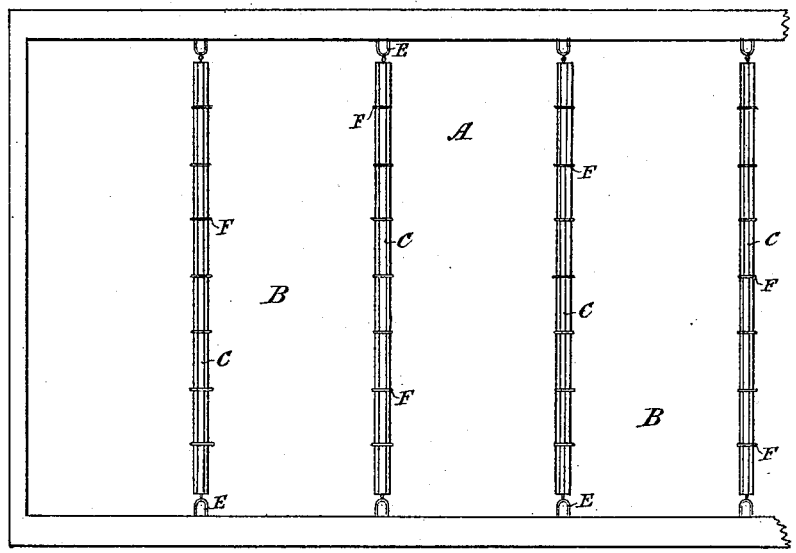

Figure 1 is a section showing the partition forming the stalls embodying my invention. Fig. 2 is a partial plan, showing the form of the stalls.

A represents a portion of a stock-car or stable, or a pen on board of a ship.

B are stalls formed by bars C, running transversely in pen or compartment on shipboard, cattle-cars, or stables, and suspended at each end by short chains D passing through ring-bolts E. These ring-bolts can be placed at any convenient height that may be required, and are fastened along the sides of the stock-car, stable, or pen on shipboard, at suitable and convenient distances apart, in order that the stalls may be made of variable widths, as may be required. The short chains D, attached to each end of bar C, are the means of giving a certain amount of oscillation to the stalls, and prevent jamming and bruising, which the animals would otherwise receive from a rigid fixture. They also afford a simple and ready means of fixing the partitions.

F are rings through which the bar is passed. To these rings are attached the panels I, forming the folding partition, which are suspended therefrom by means of short chains G. The rings F slide on the bar C, allowing the partition to fold and unfold. These partitions can be made of wood, iron, canvas, rope-netting, or any other suitable material. The partitions, when unfolded and stretched along the bar, are secured to the sides of the pen or compartment on shipboard, stock-cars, or stables, by means of short chains H, which are easily and quickly looped on hooks provided for the purpose.

The mode of operating is as follows: For example, in loading a stock-car, the bars having been placed in position, with partitions hung therefrom, and the partition folded up against the side to which the animals' heads will be directed, and the bar being of a sufficient height to allow the cattle to pass under them, all that is necessary is, as the animals pass into the car they are driven alternately toward each end and secured in their respective places successively by simply drawing out or unfolding the partition and securing it with its chains to the sides of the car. The manner of unloading is the reverse of this—viz., loosening the chain from the sides of the car and folding up the partition; then the animal is at liberty to pass out.

I claim as my invention—

The combination of the bars C, chains D and G, rings F, and chains H, and panels I, substantially as and for the purpose hereinbefore set forth.

W. STUART HUNTER.

Witnesses:
L. S. CURTIS,
JOHN D. EVANS.